(12) United States Patent
Paragios et al.

(10) Patent No.: US 7,457,436 B2
(45) Date of Patent: Nov. 25, 2008

(54) REAL-TIME CROWD DENSITY ESTIMATION FROM VIDEO

(75) Inventors: Nikos Paragios, Cranbury, NJ (US);
Visvanathan Ramesh, Plainsboro, NJ (US); Bjoern Stenger, Cambridge (GB);
Frans Coetzee, Princeton, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 11/545,236

(22) Filed: Oct. 10, 2006

(65) Prior Publication Data

US 2007/0031005 A1 Feb. 8, 2007

Related U.S. Application Data

(63) Continuation of application No. 09/944,317, filed on Aug. 31, 2001, now Pat. No. 7,139,409.

(60) Provisional application No. 60/230,264, filed on Sep. 6, 2000.

(51) Int. Cl.
*G06K 9/00* (2006.01)
*H04N 5/225* (2006.01)

(52) U.S. Cl. .................. 382/103; 382/160; 348/169

(58) Field of Classification Search .................. None
See application file for complete search history.

(56) References Cited

U.S. PATENT DOCUMENTS 5,034,986 A * 7/1991 Karmann et al. ............ 382/103

OTHER PUBLICATIONS

"Automated Measurement of Crowd Density and Motion Using Image Processing" by Velastin et al.,Road Traffic Monitoring and Control, 1994., Seventh International Conference on Apr. 26-28, 1994 pp. 127-132.*

"Hand Image Segmentation using Sequential-image-based Hierarchical Adaptation" by Utsumi et al. Multimedia Computing and Systems, 1998. Proceedings. IEEE International Conference on Jun. 28-Jul. 1, 1998 pp. 264-267.*

"A Multiresolution Hybrid Neuro-Markovian Image modeling and Segmentation" by Wilinski et al. age Processing, 1996. Proceedings., International Conference on vol. 3, Sep. 16-19, 1996 pp. 951-954 vol. 3.*

Rigoll, et al., "Robust Person Tracking in Real Scenarios with Non-Stationary Background Using a Statistical Computer Vision Approach" Visual Surveillance, 1999. Second IEEE Workshop on, (VS'99), Jun. 26, 1999 pp. 41-47. Digital Object Identifier 10.1109/VS.1999.780267.*

* cited by examiner

*Primary Examiner*—Charles Kim
(74) *Attorney, Agent, or Firm*—Donald B. Paschburg (57) ABSTRACT

A system and method for automated and/or semi-automated analysis of video for discerning patterns of interest in video streams. In a preferred embodiment, the present invention is directed to identifying patterns of interest in indoor settings. In one aspect, the present invention deals with the change detection problem using a Markov Random Field approach where information from different sources are naturally combined with additional constraints to provide the final detection map. A slight modification is made of the regularity term within the MRF model that accounts for real-discontinuities in the observed data. The defined objective function is implemented in a multi-scale framework that decreases the computational cost and the risk of convergence to local minima. To achieve real-time performance, fast deterministic relaxation algorithms are used to perform the minimization. The crowdedness measure used is a geometric measure of occupancy that is quasi-invariant to objects translating on the platform.

15 Claims, 5 Drawing Sheets

REAL-TIME CROWD DENSITY ESTIMATION FROM VIDEO

STATEMENT OF RELATED CASES

This application is a continuation of U.S. patent application Ser. No. 09/944,317, filed Aug. 31, 2001, now U.S. Pat. No. 7,139,409, which claims priority to and the benefit of U.S. Provisional Patent Application Ser. No. 60/230,264, filed on Sep. 6, 2000, both of which are hereby incorporated by reference.

BACKGROUND OF THE INVENTION

1. Technical Field

The present invention relates generally to video analysis and, more specifically, to a system and method for video analysis techniques so as to automatically screen video streams to identify events of interest.

2. Description of Related Art

With the increasing use of video surveillance and monitoring in public areas to improve safety and security, techniques for analyzing such videos are becoming increasingly important. There are various techniques that are utilized or have been proposed for video analysis. The current generation of (closed-circuit television) CCTV systems are primarily visual aids for a control operator who then analyzes the video for unusual patterns of activity and takes specific control actions. However, as the number of deployed cameras increase, monitoring all the video streams simultaneously becomes increasingly difficult and the likelihood of missing significant events of interest is quite high. Therefore, automated video analysis using Computer Vision techniques is of interest.

There has been significant research in modules and systems for video surveillance and monitoring in recent years. These surveillance systems generally involve several fundamental steps: change detection and segmentation (to identify objects different from background in the scene), tracking (using motion analysis to identify and track people/objects), illumination adaptation (for adaptation to change in illumination if the system is to be deployed in outdoor settings, handling of shadows in both indoor/outdoor settings), event detection (action detection), and reasoning.

Analyzing video for use in surveillance situations requires real-time processing on compressed video streams, low cost, camera viewpoint, etc. Many surveillance scenes which involve intermittent high traffic, for example, a subway platform, have illumination conditions characterized by near static situations mixed with occasional sudden changes due to changes in the platform state (e.g., extreme ambient illumination changes, shadowing, etc. due to train arrivals/departures in the scene). In addition, the information space is physically corrupted due to factors such as low quality cameras, noise during signal transmission, and quantization due to compression.

We now provide a survey of related art in the field. The 2-D motion detection problem has been widely investigated from the very beginning of Computer Vision since it provides a good basis to deal with high level tasks of computer vision such as motion estimation, tracking, robotics, depth recovery, etc. Prior literature on object detection using motion cues can be classified from two viewpoints: 1) In cases where a reference frame of the background scene is available, the task of motion detection is equivalent to the task of background subtraction that aims at locating the areas of the image domain that are different from the background reference frame. 2) In cases where the background scene is dynamically changing such that an image of the background is not available, then the problem is equivalent to change detection where the proposed solutions are based on the inter-frame difference (or those that use update methods that statistically model and update the changing scene).

Simple approaches for change detection use thresholding techniques. The motion detection map is obtained by applying pixel-wise (or block-wise) thresholding criteria to the observed difference image. However, such approaches do not have a robust behavior with respect to noise. In addition, the automatic determination of the threshold is an issue.

This issue was resolved by performing statistical analysis on the observed distribution of the difference frame. The statistical analysis involved approximating the frame difference value distribution by using a mixture model. Gaussian or Laplacian distributions were assumed for the component distributions for pixels whose difference values are from different hypotheses: e.g. pixels corresponding to static objects or mobile objects. A motion detection map can then be automatically determined using Bayes rule by using the observed difference frame (i.e. data) and the a posteriori probabilities of the different hypotheses given the data. While these methods are improvements over ad-hoc pixel based classification schemes, they suffer from locality since higher-order interactions across pixels are not modeled and the decisions are taken locally at a pixel-wise level.

This constraint can be dealt with by the use of more complex models where local interaction between neighboring pixels can be introduced. For example, the use of Markov chains was proposed where the motion detection problem was viewed as a statistical estimation problem. However, these methods were constrained to interactions among lines or columns and hence they had limited applicability. In addition, the use of spatial filters was proposed for situations where some a priori knowledge is available. Although these approaches demonstrate very good performance in controlled environments, they lack generality and are not able to deal with deformations as well as global illumination changes.

A further attempt to solve the motion detection and tracking problem involved the formulation with spatial (local) interaction constraints in the form of Markov Random Field model. In this framework, the motion detection map is obtained by maximizing the a posteriori segmentation probability of a joint probability density function (that incorporates the local Markov property) for the likelihood of label assignments given observations. The main advantage of this approach is that it is less affected from the presence of noise, and provides a global segmentation criterion. The optimization problem turns to be equivalent to the minimization of a global objective function and is usually performed using stochastic (Mean-field, Simulated Annealing) or deterministic relaxation algorithms (Iterated Conditional Modes, Highest Confidence First). However, although the Markov Random Field-based objective function is a very powerful model, usually it is computationally expensive, and this may be perceived as a handicap.

Accordingly, an efficient and accurate real-time video analysis technique for identifying events of interest, and particularly, events of interest in high-traffic video streams, which does not suffer from locality and which can handle deformations and global illumination changes, is highly desirable.

SUMMARY OF THE INVENTION

The present invention is primarily involved with the use of automated and/or semi-automated video analysis techniques for discerning patterns of interest in video streams. In a preferred embodiment, the present invention is directed to identifying patterns of interest in indoor settings (for example, in subway monitoring settings). Change detection and crowding/congestion density estimation are two sub-tasks in an effective subway monitoring video system. Events of interest in subway settings include, for example, people counting (or density estimation), crowdedness (congestion) detection, any anomalous presence (e.g., jumping or falling) of persons/objects onto the track, and people tracking. Crowding detection in subway platforms, for example, is of interest for closing certain passageways, dynamically scheduling additional trains, and to improve security and passenger safety in the subway environment.

A video analysis method according to the present invention decomposes the video analysis problem into two steps. Initially, a change detection algorithm is used to distinguish a background scene from a foreground. This may be done using a discontinuity-preserving Markov Random Field-based approach where information from different sources (background subtraction, intensity modeling) is combined with spatial constraints to provide a smooth motion detection map. Then, the obtained change detection map is combined with geometric weights to estimate a measure of congestion of the observed area (e.g. the subway platform). The geometric weights are estimated by a geometry module that takes into account the perspective of the camera. The weights are used to obtain an approximate translation invariant measure for crowding as people move towards or away from the camera.

Advantageously, an object segmentation scheme and proposed framework of the present invention satisfies quasi-real time computational constraints and deals with the motion detection problem within a real application scenario. The present invention is preferably used within a specific context of visual surveillance and monitoring application, in particular, the task of crowd-density estimation for real-time subway environment monitoring.

In one aspect of the present invention, a method of video analysis is provided comprising the steps of: estimating a background reference frame for representing a background; estimating geometric parameters for representing a scale variation of objects in a given frame; obtaining a change detection map for distinguishing the background from the objects in the given frame; and combining the change detection map with the geometric parameters to determine a measure of congestion of the given frame.

These and other aspects, features, and advantages of the present invention will be described or become apparent from the following detailed description of the preferred embodiments, which is to be read in connection with the accompanying drawings.

DETAILED DESCRIPTION OF PREFERRED EMBODIMENTS

It is to be understood that the exemplary system modules and method steps described herein may be implemented in various forms of hardware, software, firmware, special purpose processors, or a combination thereof. Preferably, the present invention is implemented in software as an application program tangibly embodied on one or more program storage devices. The application program may be executed by any machine, device or platform comprising suitable architecture. It is to be further understood that, because some of the constituent system modules and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate or practice these and similar implementations or configurations of the present invention.

The subway video analysis application has requirements such as real-time processing on compressed video streams, low cost, camera viewpoint, etc. Moreover, the illumination conditions are characterized by near static situations mixed with occasional sudden changes due to change in platform state (e.g., ambient illumination changes due to train arrival/departure in the scene). The task considered in the present invention involves determination of the congestion factor in subway platforms. Congestion is defined as a prolonged temporal event wherein a given percentage of the platform is crowded for a user-defined period of time.

Figure 1:
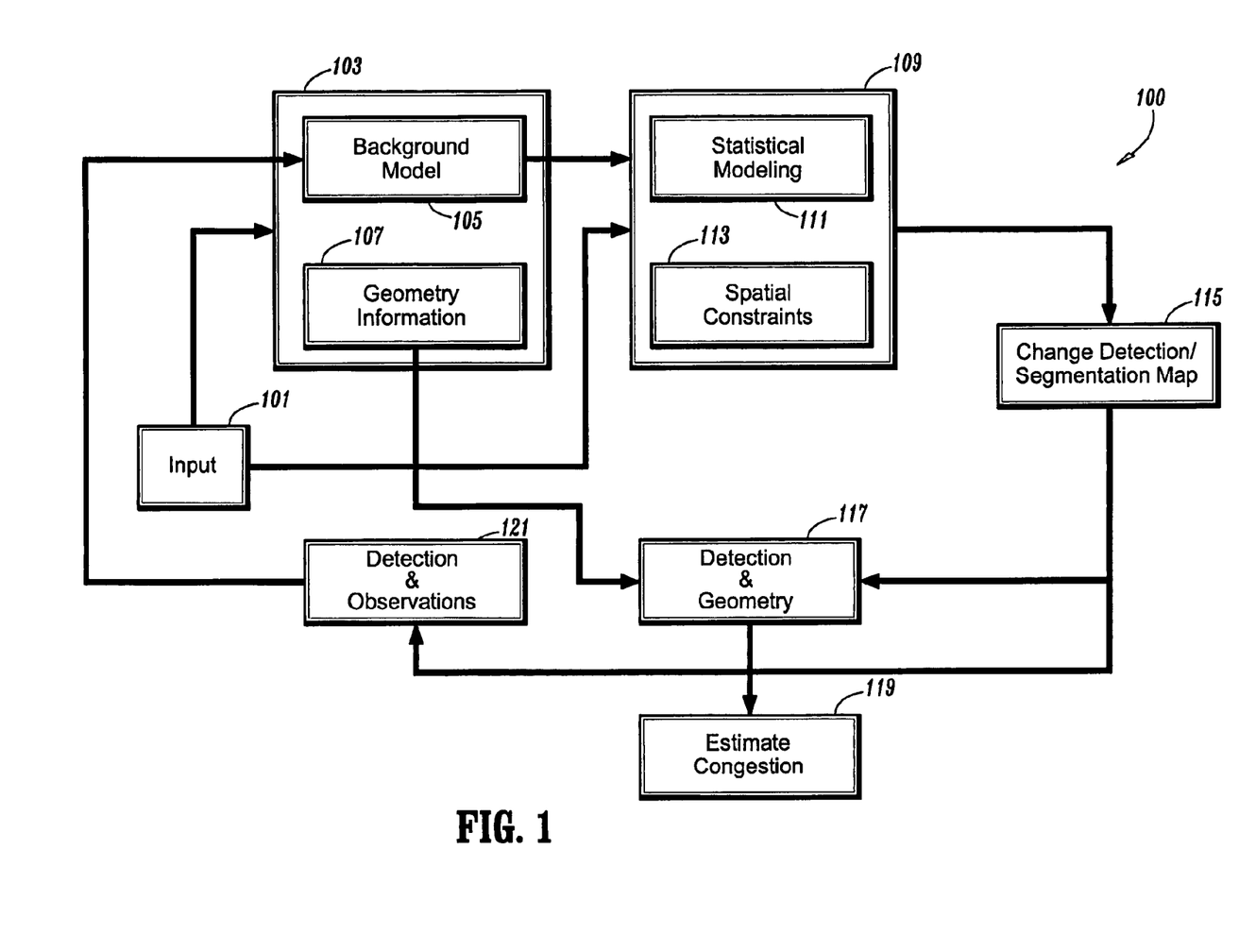
FIG. 1 is an exemplary flow diagram illustrating a method for estimating crowd density according to an aspect of the present invention.

Referring now to FIG. 1, a flow diagram illustrates a process 100 for estimating crowd density according to an aspect of the present invention. In an initializing step 103, input 101 is used to estimate a background reference frame (model) 105. Input 101 may comprise, for example, digitized video data from a camera. In addition, geometry information 107 is determined using, for example, a soft-calibration procedure that uses object size changes (for example, in terms of width and height changes) over each pixel in an input image to assign weights to each pixel. This weighting provides a translation invariant measure for congestion estimates, i.e. as an object (for example, a person) moves across the scene at various depths from the camera the congestion estimate is approximately the same.

Next, for each input frame to be processed the following procedure is preferably followed. In a detection step 109, a change detection map 115 is obtained using, for example, a Markov Random Field based approach in which information from a statistical modeling 111 is combined with spatial constraints 113 and compared with each current input frame from input 101. Thus, the background model 103 is compared with incoming video data to evaluate/detect where change in the images has occurred. In addition, the use of the Markov Random Field framework establishes coherence of the various sources of information in the resulting change detection/segmentation map.

The change detection map 115 is then combined with the geometry information 107 (step 117) to estimate congestion of the observed input frame (step 119). Then, using the change detection/segmentation map 115 combined with the current video frame (i.e the observations), the background model 103 is updated mainly, for example, for pixels in the current frame that are labeled as static pixels in an updating step 121. The process 100 is then repeated for a next input frame.

The background model 105 may be estimated, for example, using a HMM (Hidden Markov Model). Preferably, a state-based system is used for modeling and leaning major state transitions in a video image, where each state has an associated set of models for describing the local statistics of an image in a particular state. Using such an approach, it is possible to better segment and detect objects in video sequences and to model illumination changes.

The change detection/segmentation map 115 is preferably obtained using a Markov Random Field (MRF)-based approach where information from difference sources is combined. Two different motion detection models are proposed. The first is based on the analysis of the difference frame between the observed frame and the most probable background reference state, using a mixture model of Laplacian distributed components. The components of the distribution include the samples corresponding to the static background and the moving objects. The second model is intensity-based and has two sub-components: one that stands for the expected background intensity properties (color is assumed) and one that stands for the same properties in a normalized color space. This information is combined within the context of MRFs with some spatial constraints to provide the final motion detection map where local dependencies are used to ensure its regularity and smoothness. The defined objective function is implemented in a multi-scale framework that decreases the computational cost and the risk of convergence to a local minimum. Finally, two fast deterministic relaxation algorithms (ICM, HCF) are used for its minimization.

I. Markov Random Fields

A general MRF-based framework assumes:

A finite 2D lattice $S=\{s_i\}$,

A set of labels $L=\{l_i, i\ [0,N]\}$

A set of observations $I=\{I(s); s\ S\}$

And, a neighborhood graph $G=\{g_i, i\ [0,M]\}$ that defines interactions (graph edges) between the pixels (graph sites) of the finite 2D lattice.

The framework attempts to determine a global labeling map that is consistent with the observation set I while at the same time obeying spatial constraints that are defined by the neighborhood graph G. If $\Phi$ is the global labeling map that assigns the label $\Phi$ (s) to the point s, then, using the Hammersley-Clifford theorem and the equivalence between MRFs and Gibbs distributions, the probability density function for every possible labeling. $\Phi$ is given by:

$$P(\Phi) = \frac{1}{Z} e^{-\frac{U(\Phi)}{T}}, \quad (1)$$

$$U(\Phi) = \sum_{g_i} V_c(\Phi)$$

where Vc ($\Phi$) is the potential function that measures the local interactions, and $\{Z,T\}$ are normalization constants. In statistical terms, U( ) is the objective function of the system. The defined model takes into account only the constraints that are imposed by the neighborhood interaction graph G. In most of the cases, the observed data can provide some prior information about the potential of the different labelings, which can be added to the model by modifying the objective function as follows:

$$U(\Phi, I) = U_1(\Phi) + U_2(\Phi, I) \quad (2)$$

$$= \sum_G V_c(\Phi) + \sum_{s \in S} \delta(I(s)|\Phi(s))$$

This total energy may be interpreted as follows:

The first term $U_1$ expresses the expected spatial properties that are determined by the neighborhood relation graph G (regularity of the detection map), The second term $U_2$ expresses the desired image properties that should be associated with the different labels (adequacy between labeling and observation set).

These problems can be solved using, for example, a Maximum A-posteriori Probability criterion that aims at finding the labeling map that maximizes the a posteriori segmentation probability, given the observation set. This is equivalent to minimizing the designed object function that is usually performed using stochastic (Mean-field or Simulated Annealing, Monte Carlo, Metropolis) or deterministic relaxation algorithms (Iterated Conditional Modes, Highest Confidence First). In a preferred embodiment, the deterministic relaxation algorithms are used in the present invention, as they are a compromise between a minimally complex and fairly "optimal" solution. These algorithms are strongly dependent on initial conditions and can converge to a local minimum, but have the fast convergence rates that are required within the context of a specific application according to the present invention (i.e., a real-time application framework). Thus, the Iterated Conditional Modes and Highest Confidence First algorithm are considered for the optimization process in the present invention.

According to the Iterated Conditional Modes (ICM) algorithm, an initial estimation of labels is provided by the Maximum Likelihood (ML) criterion. Then, the labels are computed iteratively and in parallel for the whole frame using the latest segmentation map (regularity term) and the available observation set (adequacy term). The results of this algorithm are strongly dependent on the initial conditions but it has a fast convergence rate (related to the number of iterations used).

According to the Highest Confidence First algorithm, the optimization procedure involves the following: for all pixels in the image grid, the labels that provide the greatest local decrease of the objective function are selected in a hierarchical way. Thus, the sites are not visited in turn and the algorithm focuses constantly on the unlabeled sites, by introducing an "instability" measure according to which sites are selected (the pixel that introduces the lowest instability (minimum change of the objective function). However, it is to be noted that this algorithm is generally more time consuming than the ICM algorithm since there is a need for construction and maintenance of the "instability" measurement heap structure.

II. Motion Detection

Two different approaches may be used to perform motion detection for obtaining the change detection map 115. The first involves the use of a data attraction term which aims at providing a motion detection map that is coherent with the observation set. This coherence is defined through conditional probabilities of three different modules; an difference-based module, an color-based module and a normalized color based invariant module. The second approach involves the use of a regularity constraint, i.e. by defining local pixel interactions and penalizing situations where neighborhood pixels are labeled differently.

II.a) Frame Difference Module: Global Statistical Constraint

Let D(s) the difference between the current and the reference frame:

$$D(s)=I(s)-B(s)$$

Since the reference frame might be multi-state, the component that better expresses the observed values is considered to provide its values. If it is assumed that this frame is a selection of independent points, then it is composed of two populations: a static population contains the background points, while the mobile population contains the points that belong to moving objects and usually preserve different illumination properties with respect to the corresponding background properties. It is to be noted that although color image sequences are available, they are converted to gray to decrease the noise influence induced by the different color bands and video board. In addition, the data is compressed (MJPEG) to introduce quantization of the color channels.

The mobile population can further be decomposed into a plurality of different sub-populations with respect to the different intensity properties preserved by the moving objects. Thus, the observed density function of the difference frame can be decomposed into two main statistical components, the static one and the mobile one:

$$p_D(d) = P_{st} p_{st}(d|\Theta_{st}) + P_{mb} p_{mb}(d|\Theta_{mb}) \quad (3a)$$

where $\Theta_{st}$ (resp. $\Theta_{mb}$) are the unknown parameters of the static (resp. mobile) component, and ($P_{st}, P_{mb}$) are their a priori probabilities. A conditional probability density function with respect to the mobile component comprises, for example, a collection of sub-components that expresses the different illumination properties of the observed objects (in terms of the difference frame). Thus, a mixture density can be used to model the statistical behavior of the mobile component, which is given by:

$$p_{mb}(d|\Theta_{mb}) = \sum_{i=1}^{C_N} P_{i,mb} p_{i,mb}(d \mid \Theta_{i,mb}) \quad (3b)$$

where $P_{i,mb}$ is the a priori probability of the i component and $\Theta_{i,mb}$ the unknown density function parameters. By embedding [eq. (3b)] to [eq. (3a)] the following Mixture Model can be obtained:

$$p_D(d) = P_{st} p_{st}(d|\Theta_{st}) + P_{mb} \sum_{i=1}^{C_N} P_{i,mb} p_{i,mb}(d|\Theta_{i,mb})$$

Finally, it can be assumed that these probability density functions follow Gaussian law [$\Theta_i=(\mu_i,\sigma_i)$].

For unknown parameters of this model, some constraints are imposed by the problem. Differences between background values appear due to the presence of noise, and as a consequence, the conditional probability density function with respect to the static case is zero-mean. Additionally, it can be assumed that the mobile mixture model contains a zero-mean density function due to the fact that some moving objects may preserve similar intensity properties with respect to the background. The estimation of the unknown parameters of this model $\{(P_i,\Theta_i): i \in \{0, \ldots, C_N\}\}$ may be done using, for example, the Maximum Likelihood principle.

II. b) Color-based Change Detection Module

Color image sequences may also be available given the configuration of a system according to the present invention. Thus, during the learning phase for the reference frame, some color-based information can be also extracted for each pixel of the image. This information is preferably modeled, for example, using independent Gaussian probability density functions [$p_{st,R}(\ ), p_{st,G}(\ ), p_{st,B}(\ )$] (one for each color band) and is used to determine the background reference. Moreover, given an observed intensity value for a given pixel, these density functions are used to measure the probability of both being and not being in the background case:

$$[p_{mb,R}(\ )=1-p_{st,R}(\ ), p_{mb,G}(\ )=1-p_{st,G}(\ ), p_{mb,B}(\ )=1-p_{st,B}(\ )].$$

A more elegant way to create and maintain a background model in the RGB color space is by considering a powerful mathematical framework, the Hidden Markov Models.

The intensity color characteristics of each pixel in the image can be described using a state-based system, which according to the present invention is preferably modeled using a probabilistic state model (for example, a Markov chain), where each node corresponds to a gross system state. With every state is associated a set of state-dependent probability distributions describing the statistics of agents that can be found within this system state.

Figure 2:
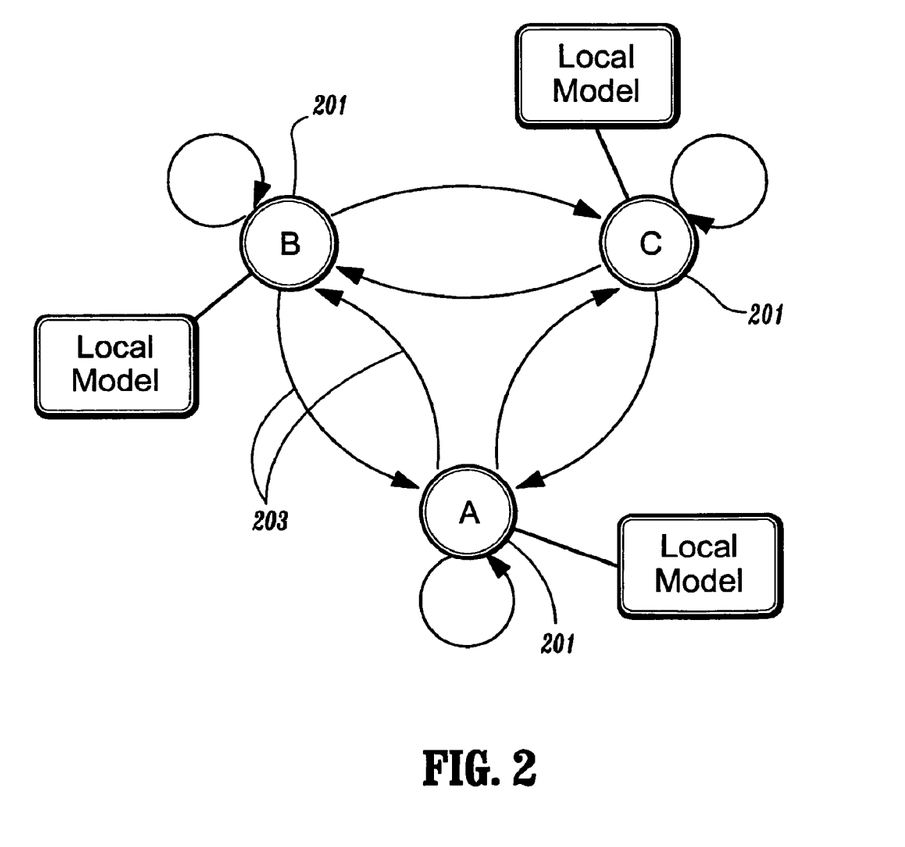
FIG. 2 depicts an exemplary probabilistic state model according to an aspect of the present invention.

FIG. 2 depicts an exemplary probabilistic state model according to an aspect of the present invention. Each node 201 comprises a local probability representation which represents the environment conditioned on a major state. The major states are connected by probabilistic transition models 203.

According to an aspect of the present invention, there are preferably two different approaches to implementing state-dependent classification of image pixels. For example, it is to be appreciated that the architecture of the state model can be fixed in some systems, or adapted to an image sequence in other systems. The former approach involves a fixed design of the network, in which a user-defined, fixed state model is used. In this approach, a user selects K regions in an image based on the context of the image. For example, in an image of a train stop scene, the image may be divided into separate regions corresponding to the train tracks, waiting area for pedestrians, and ceiling area. The number of states $Q_k$ in each region K is defined based on a number of actors $n_k$ present in a region K (K=1, 2, ... K) and a number of states $s_l$ for each agent (class) l (l=1, 2, ... $n_k$ For example, in a train track area, three states may be defined corresponding to: having no train present, a train which is stationary, and a train that is moving. A default implementation preferably uses a fully connected Markov chain for each region K. A-priori knowledge about the scene can be used to modify the links in the network. For example, in the above example, certain transitions in state are impossible (i.e., instantaneous transitions from a stationary train to having no train may be zero).

Each of the states preferably maintains a joint distribution for features in each state, for every agent class. A default implementation may be a mixture of Gaussian models for the features. Training of the fixed design network system is preferably performed using annotated sequences, using standard techniques for estimating the state transition probabilities of the Markov chain (such as Baum-Welch or EM algorithms).

The second approach to implementing state-dependent classification of image pixels according to an aspect of the present invention involves growing networks in each region. In this approach, the Markov chain in each region (regions are preferably manually selected by a user) is automatically determined by modifying the number of nodes as time progresses and more data is acquired. This can be implemented in two ways: 1) each region may be initialized with one node and a local model is generated for the features. The number of nodes is increased as more data becomes available and the local models are updated. or 2) a large, redundant network is generated, which is then trimmed to a minimal network. Standard techniques known in the art may be used to accomplish this task.

Figure 3A:
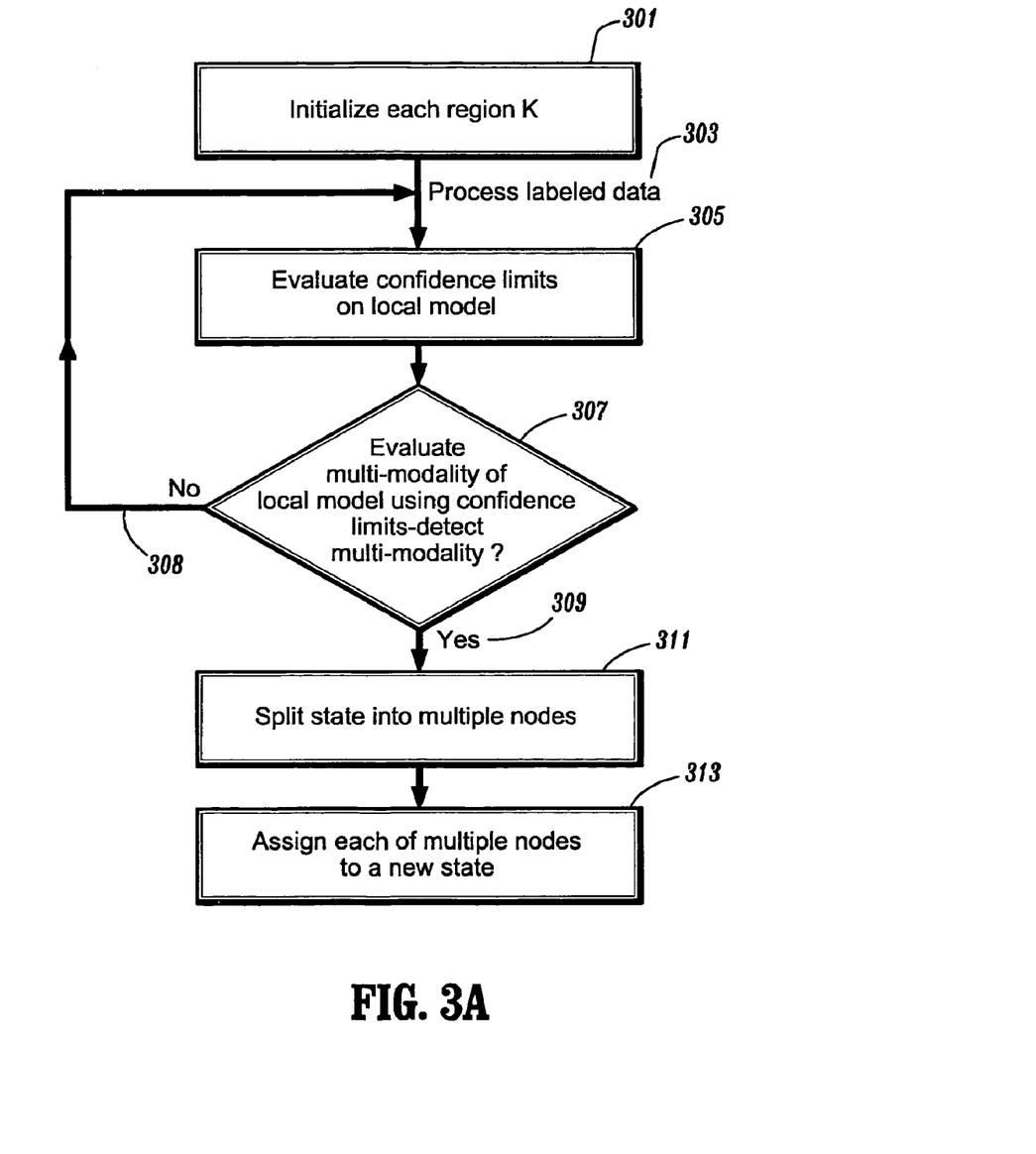
FIG. 3A depicts a flow diagram of a preferred method of determining a Markov chain in each region according to an aspect of the present invention.

FIG. 3A depicts a flow diagram of a preferred method of determining a Markov chain in each region according to an aspect of the present invention. In step 301, each region is initialized with a single node and a local model (for example, a histogram). As labeled data is processed (303), confidence limits (goodness of fit) on the local model are evaluated (step 305). Based on the confidence limits, a multi-modality of the local model is evaluated (step 307). If a multi-modal local model is detected (309), the state is split into multiple nodes (step 311). Each node is then assigned to a new state (step 313). Preferably, each state remains connected to all other nodes with which the original node was connected. The probabilities between the new states may be divided, for example, based on a technique described in M. Ostendorf and H. Singer, "HMM topology design using maximum likelihood successive state splitting," Computer Speech & Language, vol. 11, no. 1, pp. 17-41, 1997. If no multi-modality is detected (308), the system goes back to step 303. Other ways of model selection such as the use of the Minimum-Description Length criterion or the Cross-Validation criterion can be used to do the state splitting.

Figure 3B:
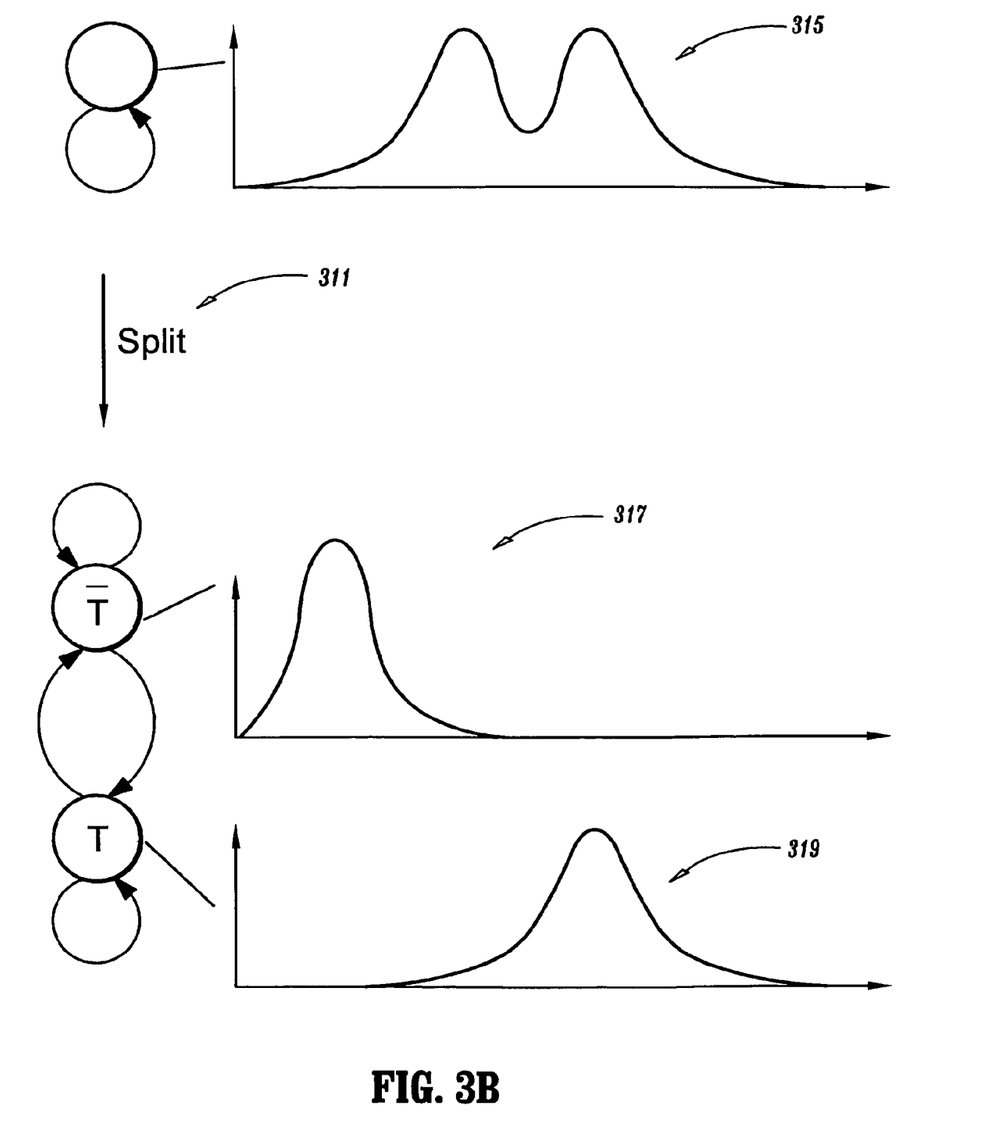
FIG. 3B is an exemplary schematic illustration of the method of splitting a node in a multi-state system for growing a Markov network to find an effective number of states according to an aspect of the present invention.

FIG. 3B is an exemplary schematic illustration of the method of splitting a node in a multi-state system for growing a Markov network to find an effective number of states according to an aspect of the present invention. A local model 315 demonstrating multi-modality is split (in accordance with step 311) into multiple nodes 317 and 319. Each of the multiple nodes 317 and 319 is assigned to a new state, thus resulting, for example, in a two-state model here. It is to be noted that the above algorithms used labeled data and fixed regions.

II. c) Invariant Normalized Color Module

Although the color module captures the background intensity properties, it is very sensitive to global illumination changes (e.g. the arrival of a train affects the observed intensities of the platform next to the train line) as well as shadows.

To deal with these limitations introduced by the color based change detection module, a normalization of the RGB color space is preferably performed. As a result, the background properties are not determined by their actual observed values but rather from their relative values in comparison with an associated statistical model.

For example, let (R(s), G(s), B(s)) be the observed color vector. A shadow invariant representation is used, which is given by:

$$\begin{bmatrix} \hat{r}(s) \\ \hat{g}(s) \end{bmatrix} = \begin{bmatrix} \dfrac{\hat{R}(s)}{\hat{R}(s) + \hat{G}(s) + \hat{B}(s)} \\ \dfrac{\hat{G}(s)}{\hat{R}(s) + \hat{G}(s) + \hat{B}(s)} \end{bmatrix}$$

The uncertainties of the $$\begin{bmatrix} r(s) \\ g(s) \end{bmatrix}$$

are dependent on the sensor noise variance as well as from the their true values S(s)=(R(s), G(s), B(s)) (due to the non-linearity of the selected transformation). The observed distribution of samples can be approximated using a pixel-wise Gaussian multi-variate distribution given by:

$$\begin{bmatrix} \hat{r}(s) \\ \hat{g}(s) \end{bmatrix} = \begin{bmatrix} \dfrac{R(s) + \eta_R(s)}{S(s) + \eta_R(s) + \eta_G(s) + \eta_B(s)} \\ \dfrac{G(s) + \eta_G(s)}{S(s) + \eta_R(s) + \eta_G(s) + \eta_B(s)} \end{bmatrix} \sim N\left( \begin{pmatrix} r(s) \\ g(s) \end{pmatrix}, \sum_{\hat{r},\hat{g}} \right)$$

The detailed expression of the pixel-wise covariance matrix $\Sigma_{\hat{r},\hat{g}}$ is presented at M. Grieffenhagen, V. Ramesh, D. Domaniciu and H. Niemann, "Statistical Modeling and Performance Characterization of a Real-Time Dual Camera Surveillance System," IEEE Conference on-Computer Vision and Pattern Recognition, 2000.

Then, given the estimates of the mean vector as well as the covariance matrix we can estimate the (Mahalanobis) distance between the observed samples $$\begin{bmatrix} \hat{r}(s) \\ \hat{g}(s) \end{bmatrix}$$

and the expected (true) background distribution $$\begin{bmatrix} \mu_{\hat{r}(s)} \\ \mu_{\hat{g}(s)} \end{bmatrix}.$$

Following the work of the "Statistical Modeling and Performance" reference above by M. Grieffenhagen et al., it can be shown that a metric can be defined which corresponds to the probability that the observed values [r̂(s), ĝ(s)] refer to a background pixel.

$$\hat{d}^2(s) = (\hat{r}(s) - \mu_{\hat{r}(s)})^T 2 \sum_{\hat{r},\hat{g}}^{-1} (\hat{r}(s) - \mu_{\hat{r}(s)})$$

This distance can be used as a data adequacy term for the change detection problem where important values refer to strong mobile pixel hypothesis and low values to static pixel hypothesis. According to the "Statistical Modeling and Performance" reference above by M. Grieffenhagen et al., for the background pixels the distribution of the distance is $\chi^2$ [$p_{st,\chi^2}()$] and has two degrees of freedom, while for the object pixels a non-central $\chi^2$ distribution is assumed with two degrees of freedom and a non-centrality parameter $c[p_{mb,\chi^2}()]$.

Next, the issue of how the energy function for the Markov Random Field should be set is described.

II. d) Setting the Energy

Figure 4:
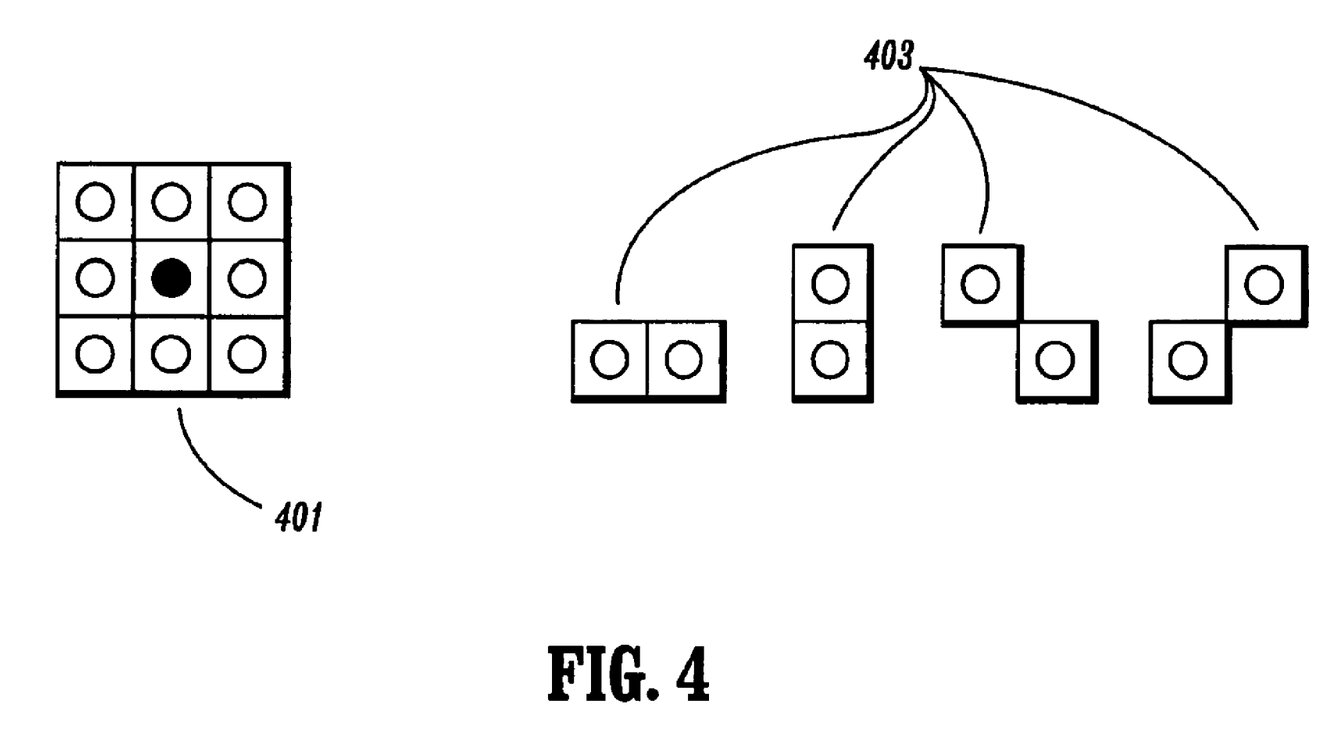
FIG. 4 illustrates a second-order neighborhood and sets of two pixel cliques for defining a regularity constraint according to an aspect of the present invention.

FIG. 4 illustrates a second-order neighborhood 401 and sets of two pixel cliques 403 for defining a regularity constraint according to an aspect of the present invention. This regularity constraint aims at finding a detection map that does not preserve many discontinuities. This is formulated by the use of a penalty term in the objective function when two neighborhood pixels are assigned to different labels (discontinuity) and not penalizing it for the opposite case (where two neighborhood pixels are assigned to a same label). Thus:

$$U_1(\Phi) = \sum_{g_{ms} \in G} V_C(\Phi(m), \Phi(s)) \quad (4)$$

where $g_{ms}$ is an edge of graph G that connects the pixel s with the pixel m (neighborhood pixels), and $V_C(\Phi(m),\Phi(s))$ is the clique potential function given by $$V_C(\Phi(m), \Phi(s)) = \begin{cases} +\alpha_{df}, & \text{if } \Phi(m) \neq \Phi(s) \\ -\alpha_{st}, & \text{if } \Phi(m) = \Phi(s) = st \\ -\alpha_{mb}, & \text{if } \Phi(m) = \Phi(s) = mb \end{cases} \quad (5)$$

where $\{\alpha_{df} > 0\}$ is the cost to pay for neighbors with different labeling, while $\{\alpha_{st}, \alpha_{mb} > 0\}$ are the constants that enforce the regularity for the static and the mobile case.

Since different data adequacy terms are available, then given a point s, and the associated observation $\{D(s),I(s)\}$, the conditional probabilities for the static and the mobile case as well as the background probabilities in the color and the normalized color space, can be directly estimated.

Then, according to the MRF model, an optimal segmentation map is the one that maximizes the a posteriori segmentation probability, given the observation set. This is equivalent to minimizing the $-\log(\ )$ function of this probability, thus the attraction term can be defined with respect to the background subtraction module as the following:

$$U_2(\Phi, D) = -\sum_{s \in S} \log[p_{\Phi(s)}(D(s))] \quad (6)$$

where $p_{\Phi(s)}(D(s))$ is the conditional probability with respect to the hypothesis $\{\Phi(s) \in (st, mb)\}$. If the pixel s is labeled as static while the true case is mobile, then the conditional static probability is very small and the $-\log(\ )$ function significantly charges the objective function. If the pixel s is labeled as mobile, then the objective function is minimized.

Similarly, the expected color intensities properties of the background can be incorporated to the global objective function as follows:

$$U_3(\Phi, I) =$$
$$-\sum_{s \in S} \log[w_r p_{\Phi(s),R}(I_R(s))] + \log[w_g p_{\Phi(s),G}(I_G(s))] + \log[w_b p_{\Phi(s),B}(I_B(s))]$$

where $[w_r, w_g, w_b]$ are normalized weights that balance the contribution of the different color bands. The interpretation of the above term is clear since if a pixel is misclassified, then the objective function is significantly charged due to the fact that the conditional probabilities in the color space do not support the labeling decision.

Finally, the information provided by the normalized color space can be also used as a third data adequacy term to enforce the quality of the segmentation map. This information is incorporated to the objective function using the following third energy term that aims at maximizing the a posteriori segmentation probability with respect to the normalized color space features:

$$U_4(\Phi, \hat{I}) = -\sum_{s \in S} \log[p_{\Phi(s), \chi^2}(\hat{I}(s))]$$

where $\hat{I}$ is the transformation of the input image to the normalized color feature space.

Then, the global objective function can be defined, for example, as a linear combination of the different motion detection and regularity modules as follows:

$$U(\Phi, I, \hat{I}, D) = \alpha U_1(\Phi) + \beta U_2(\Phi, D) + \gamma U_3(\Phi, I) + \delta U_4(\Phi, \hat{I})$$

where $\alpha$, $\beta$, $\gamma$, $\delta$ are constant weights that balance the contribution of the different motion detection and regularity terms.

The interpretation of the above function is as follows:

The first term $U_1$ imposed the constraint of a smooth segmentation (motion detection) map by penalizing the situation of neighborhood pixels with different labels, The other terms $U_2$-$U_4$ are data adequacy terms and stand for a motion detection map that is supported by the observation set. Moreover, these terms aim at providing a segmentation map that maximizes the a posteriori segmentation probability according to different image features (observed intensities, background subtraction, and normalized color features).

The designed objective function is preferably comprised of two kinds of terms that have different natures. The first kind is data-dependent, and provides a labeling that is consistent with the available observation set, while the second is label-dependent that introduces the regularity constraint and aims at finding a smooth motion detection map. The main handicap of the regularity term is that it doesn't make any use of the observed data which can provide important information about the real discontinuities. In that case, irregularities might be considered as natural cases and hence, the spatial constraint term has to be modified to incorporate this ability. Usually these discontinuities are associated with high gradient values (unless the case of a textured background is considered).

However, for the considered case given the assumption that a background reference frame is available, these discontinuities can be sought on the difference frame (in that case, a textured background may also be handled).

To determine the real boundaries between the moving objects and the static parts of an image, the absolute difference frame between the observed image and the background reference frame is used. Then, it is assumed that in this absolute difference frame, pixels with high gradient values correspond to the discontinuities on the real plane which might be captured using a Gaussian distribution:

$$p_D(s) = \frac{1}{\sqrt{2\pi}\sigma_D} e^{-\frac{||[\nabla|D(s)|]||}{2\sigma_D^2}}$$

Since the probability that point s lies on a discontinuity is defined, the clique potentials can be reformulated as the following:

$$V_C(\Phi(m), \Phi(s)) = \begin{cases} +\alpha_{df}\, p_D(s), & \text{if } \Phi(m) \neq \Phi(s) \\ -\alpha_{st}(1-p_D(s)), & \text{if } \Phi(m) = \Phi(s) = st \\ -\alpha_{mb}(1-p_D(s)), & \text{if } \Phi(m) = \Phi(s) = mb \end{cases}$$

The above modification enables an attraction effect on the regularity item since it elaborates the demand of a smooth detection map while preserving the discontinuities as they can be determined from the observed data set.

The minimization of the objective function is a very difficult task, since the corresponding solution space is huge and even the simplest minimization algorithm demands considerable amount of computations. These constraints are preferably overcome by the use of multi-scale techniques that reduce to a significant ratio the required cost and perform a smooth operation to the objective function. The main idea is to solve the problem in many different label spaces (subsets of the finest one). A sophisticated multi-scale approach is preferably adopted which comprises defining a consistent multi-grid label model by using detection maps which are constrained to be piecewise constant over smaller and smaller pixel subsets. The objective function that is considered at each level is then automatically derived from the original finest scale energy function. Also, full observation space is used at each label level and there is no necessity for constructing a multi-resolution pyramid of the data.

III. Crowd Density Estimation

Estimation of the "real" crowdedness of an observed area is done by incorporation of the geometrical constraints 107 which introduce weights for the image pixels based on their relative position from the camera with respect to the real 3-D world. The geometric factor is chosen such that the resulting crowdedness measure computed is translation invariant (assuming no severe occlusions happen) and accounts for perspectivity. The total weighted sum over the segmented region is the calculated crowdedness measure.

Given the segmentation map, obtaining a crowdedness measure that accounts for perspectivity is accomplished as follows: since the platform is planar, quasi-calibration information can be obtained by using the images of the trains. This quasi-calibration information is the information about the height variation across each scan-line (this assumes that the vertical (z-axis) of the world coordinate system projects to the vertical in the image) and the horizontal variation across each scan-line. Thus, two functions H(r) and V(r) are defined which correspond to the parametric functions that describe the relative scale of the widths and heights of a unit box in the world projected to a given row r in the image. V(r) is estimated by using the image of trains stopped in the left and right platforms. The user identifies the rectangle (polygon, in the case of a camera fitted with wide-angle lens) corresponding to the projection of the rectangle in 3D corresponding to the train surface. V(r) is then just the relative heights obtained for each row from the polygon. A quadratic function is used for computing a robust fit to the data samples to obtain V(r). The scale variation in the horizontal direction with respect to r is estimated using the region of interest outlined in the platform. The rectangle on the platform is mapped on to the polygon in the image coordinates. While a homography can be estimated between the ground plane and the image plane coordinates, the scale variation H(r) can be approximated by a quadratic function as done for V(r) above. More detailed calibration of the camera can be done, for example, by using landmarks (e.g. posts in the subway platform).

For the case of estimating the size variation with respect to depth of the object in the manner identified above, the geometric factor for each pixel G(r,c) is obtained by just obtaining the product H(r)*V(r). It is to be noted that this is only an approximation. The exact geometric factor should be a function of both r and c. Given the geometric factors G(r,c) the crowdedness estimate, C, is obtained by weighted average over all pixels with the segmentation results S(r,c) (with G(r,c) as weights). The crowdedness measure C is a real number between 0 and 1. It is to be noted that the measure C is approximately invariant to translations of an object on the ground plane. To deal with situations where there is significant occlusion, several estimates of C over a long period of time (usually 30 seconds) are taken and used to estimate the average or median crowdedness measure. This is a reasonable estimate of the crowdedness measure when there is regular flow (situations where the platform is not too crowded). It is also true that by averaging or taking the median over a longer time window the estimated crowd density can be made less sensitive to short term bursts in traffic (e.g. when trains arrive). The situations that involve accumulation of people show periods of increase in the measure C and we are interested in alarms when the measure C exceed a given threshold $T_C$ (typically equal to about 0.6 or 0.7).

VI. Updating Process

One of the main constraints of the proposed approach is the ability of performing for a real-time scenario. To deal with this constraint a multi-scale approach has been adopted which decreases the computational cost by a factor of five. Moreover, the parts of the framework that are time consuming have been implemented using the INTEL image processing library to perform optimized image processing operations. Finally, the use of deterministic relaxation algorithms has been also adopted (with the risk of convergence to a local minimum) since they are favorably compared with the stochastic relaxation algorithms with respect to the computational complexity.

The last issue that has to be dealt with is the extraction of the background reference frame as well as its update. In the example dealing with underground subway platforms, the task of background extraction and updating is facilitated due to the fact that global changes on the lighting conditions do not have to be dealt with.

As far as the extraction of a background frame is concerned, two different approaches might be considered. The simplest way to define this reference frame is during the off-line hours of the subway network. The lighting conditions remain the same but since trains do not circulate the platforms are empty and hence a perfect background reference frame can be determined. In cases where this option is not available, the median image can be used over a long-period training to determine the background reference frame. As far the update of this frame is concerned, a pseudo-Kalman filtering technique is considered. Thus, using the motion detection map, the background values for the static pixels of the current detection map are updated according to, for example, the following iterative scheme:

$$\mu^t(s) = \alpha \mu^{t-1}(s) + (1-\alpha) I^t(s)$$

where $\mapsto \in [0,1]$. A similar update equation can be defined for the variance values.

It is to be noted that the system of the present invention may be integrated into a larger system wherein communication with a central control center is enabled when specified events of interest in video scenes occur.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the present invention. All such changes and modifications are intended to be included within the scope of the invention as defined by the appended claims.

What is claimed is:

1. An optical system, comprising:
   a camera;
   a processor having video analysis application software, the video analysis application software being operable to:
   estimate a background reference frame for representing a background;
   estimate geometric parameters for representing a scale variation of objects in a given frame;
   obtain a change detection map for distinguishing the background from the objects in the given frame;
   combine the change detection map with the geometric parameters to determine a measure of congestion of the given frame;
   initialize each region of the image with a single node and a local model;
   evaluate confidence limits of the local model; and
   evaluate the local model to determine a multi-modality, wherein if a multi-modality is detected the local model is split into multiple nodes.

2. The system of claim 1, wherein said scale variation comprises variation in the object's width and height as a function of said object's position in the given frame.

3. The system of claim 1, wherein the video analysis application software is further operable to update the background reference frame using the change detection map.

4. The system of claim 3, wherein static pixels of the background reference frame are updated.

5. The system of claim 1, wherein the measure of congestion is a prolonged temporal event wherein a given percentage of a platform is crowded for a user-defined period of time.

6. The system of claim 1, wherein each of said multiple nodes is assigned to a new state.

7. The system of claim 1, wherein the camera monitors a scene with traffic.

8. The system of claim 1, wherein the camera monitors a transportation platform.

9. The system of claim 1, wherein the camera monitors a subway platform.

10. A method of measuring congestion in an optical system, comprising:
    estimating a background reference frame for representing a background;
    estimating geometric parameters for representing a scale variation of objects in a given frame;
    obtaining a change detection map for distinguishing the background from the objects in the given frame;
    combining the change detection map with the geometric parameters to determine a measure of congestion of the given frame;
    initializing each region of the image with a single node and a local model;
    evaluating confidence limits of the local model; and
    evaluating the local model to determine a multi-modality, wherein if a multi-modality is detected the local model is split into multiple nodes.

11. The method of claim 10, wherein said scale variation comprises variation in the object's width and height as a function of said object's position in the given frame.

12. The method of claim 10, comprising updating the background reference frame using the change detection map.

13. The method of claim 12, wherein static pixels of the background reference frame are updated.

14. The method of claim 10, wherein the measure of congestion is a prolonged temporal event wherein a given percentage of a platform is crowded for a user-defined period of time.

15. The method of claim 10, wherein each of said multiple nodes is assigned to a new state.

* * * * *